United States Patent
Kimura et al.

(10) Patent No.: US 11,617,997 B2
(45) Date of Patent: Apr. 4, 2023

(54) HYDROGEN PRODUCTION APPARATUS AND HYDROGEN PRODUCTION METHOD

(71) Applicant: IHI CORPORATION, Tokyo (JP)

(72) Inventors: Hiroyuki Kimura, Tokyo (JP); Tomoya Muramoto, Tokyo (JP); Satoshi Seo, Tokyo (JP)

(73) Assignee: IHI CORPORATION, Tokyo (JP)

( * ) Notice: Subject to any disclaimer, the term of this patent is extended or adjusted under 35 U.S.C. 154(b) by 226 days.

(21) Appl. No.: 17/108,616

(22) Filed: Dec. 1, 2020

(65) Prior Publication Data
US 2021/0086157 A1 Mar. 25, 2021

Related U.S. Application Data

(63) Continuation of application No. PCT/JP2019/006332, filed on Feb. 20, 2019.

(30) Foreign Application Priority Data

Jun. 5, 2018 (JP) .............................. JP2018-107491
Jun. 29, 2018 (JP) .............................. JP2018-124110

(51) Int. Cl.
*B01J 10/00* (2006.01)
*C01B 32/164* (2017.01)
(Continued)

(52) U.S. Cl.
CPC ............. *B01J 10/005* (2013.01); *C01B 3/384* (2013.01); *C01B 32/164* (2017.08); *F24S 20/30* (2018.05); *B82Y 30/00* (2013.01); *B82Y 40/00* (2013.01)

(58) Field of Classification Search
CPC .... B01J 10/005; B01J 2219/0892; B01J 6/00; B01J 19/127; C01B 3/384; C01B 32/164;
(Continued)

(56) References Cited

U.S. PATENT DOCUMENTS

| 5,997,837 A | 12/1999 | Lynum et al. |
| 2002/0090330 A1 | 7/2002 | Smalley et al. |

(Continued)

FOREIGN PATENT DOCUMENTS

| AU | 2013201704 B2 | 4/2013 |
| EP | 1341604 A1 | 9/2003 |

(Continued)

OTHER PUBLICATIONS

The extended European search report dated Feb. 14, 2022 in corresponding EP Patent Application No. 19814930.4 (9 pages).
(Continued)

*Primary Examiner* — Steven J Bos
*Assistant Examiner* — Syed T Iqbal
(74) *Attorney, Agent, or Firm* — Rothwell, Figg, Ernst & Manbeck, P.C.

(57) ABSTRACT

A hydrogen production apparatus includes: a first furnace configured to heat a mixed gas of a raw material gas, which contains at least methane, and hydrogen to 1,000° C. or more and 2,000° C. or less; and a second furnace configured to accommodate a catalyst for accelerating a reaction of a first gas generated in the first furnace to a nanocarbon material, and to maintain the first gas at 500° C. or more and 1,200° C. or less.

10 Claims, 5 Drawing Sheets

(51) Int. Cl.
*F24S 20/30* (2018.01)
*C01B 3/38* (2006.01)
*B82Y 30/00* (2011.01)
*B82Y 40/00* (2011.01)

(58) Field of Classification Search
CPC ............ C01B 32/16; C01B 2203/0277; C01B 2203/1241; C01B 3/26; F24S 20/30; F24S 20/20; F24S 70/60; F24S 23/79; F24S 23/71; F24S 23/77; F24S 70/16; B82Y 30/00; B82Y 40/00; Y02E 10/40
See application file for complete search history.

(56) References Cited

U.S. PATENT DOCUMENTS

| | | |
|---|---|---|
| 2003/0182861 A1 | 10/2003 | Weimer et al. |
| 2003/0208959 A1 | 11/2003 | Weimer et al. |
| 2005/0148806 A1 | 7/2005 | Cruijsberg et al. |
| 2006/0140848 A1 | 6/2006 | Weimer et al. |
| 2006/0188433 A1 | 8/2006 | Weimer et al. |
| 2006/0205989 A1 | 9/2006 | Little et al. |
| 2008/0156630 A1 | 7/2008 | Lee et al. |
| 2010/0305221 A1 | 12/2010 | Schunk et al. |
| 2010/0314235 A1 | 12/2010 | Varadaraj et al. |
| 2011/0193026 A1 | 8/2011 | Weimer et al. |
| 2012/0219490 A1* | 8/2012 | Noda .................... B01J 37/347 422/618 |
| 2012/0241677 A1 | 9/2012 | Perkins et al. |
| 2014/0005283 A1 | 1/2014 | Nakamura et al. |
| 2014/0086820 A1* | 3/2014 | Nakamura ............ B01J 8/1827 422/142 |
| 2016/0002033 A1 | 1/2016 | Noda et al. |
| 2016/0199807 A1 | 7/2016 | Nakamura et al. |
| 2016/0362351 A1 | 12/2016 | Nagaki et al. |
| 2021/0080176 A1 | 3/2021 | Kimura et al. |

FOREIGN PATENT DOCUMENTS

| | | |
|---|---|---|
| GB | 1007423 A | 10/1965 |
| JP | H06-511224 A | 12/1994 |
| JP | 2005-511467 A | 4/2005 |
| JP | 2005-515295 A | 5/2005 |
| JP | 2006-522081 A | 9/2006 |
| JP | 2008-545603 A | 12/2008 |
| JP | 2008303184 A | 12/2008 |
| JP | 2010-131487 A | 6/2010 |
| JP | 2010-526759 A | 8/2010 |
| JP | 2011-241104 A | 12/2011 |
| JP | 2012-171808 A | 9/2012 |
| JP | 2012-188321 A | 10/2012 |
| JP | 2013-001639 A | 1/2013 |
| JP | 2015-196619 A | 11/2015 |
| JP | 2016-055209 A | 4/2016 |
| JP | 2017-178827 A | 10/2017 |
| JP | WO2019/234991 A1 | 6/2021 |
| WO | 03/049853 A1 | 6/2003 |
| WO | 2011/030821 A1 | 3/2011 |
| WO | 2019/197253 A1 | 10/2019 |

OTHER PUBLICATIONS

Australian Examination Report for corresponding AU Application No. 2019281558 dated Dec. 7, 2021 (12 pages).
The extended European search report dated Mar. 23, 2022 in corresponding EP Patent Application No. 19815257.1 (10 pages).
C. Agrafiotis et al., "Solar thermal reforming of methane feedstocks for hydrogen and syngas production—A review", Renewable and Sustainable Energy Reviews, vol. 29, 2014, pp. 656-682.
S. Abanades et al., "Production of hydrogen by thermal methane splitting in a nozzle-type laboratory-scale solar reactor", International Journal of Hydrogen Energy, vol. 30, No. 8, 2005, pp. 843-853.
Australian Examination Report for corresponding AU Application No. 2019281557 dated Jul. 15, 2021. (3 pages).
International Search Report issued in Application No. PCT/JP2019/006332 dated Apr. 23, 2019, 4 pages.
J. Yeheskel, et al., "Thermolysis of methane in a solar reactor for mass-production of hydrogen and carbon nano-materials", Carbon 49 (2011) pp. 4695-4703.
N.M. Mubarak, et al., "An overview on methods for the production of carbon nanotubes", Journal of Industrial and Engineering Chemistry 20 (2014) pp. 1186-1197.
K. A. Shah, et al., "Synthesis of carbon nanotubes by catalytic chemical vapour deposition: A review on carbon sources, catalysts and substrates", Materials Science in Semiconductor Processing 41 (2016) pp. 67-82.
E. Diaz, et al., "New concentrated solar power plants based on fuel cells", 9th International Exergy, Energy and Environment Symposium (IEEES-9), May 14-17, 2017, Split, Croatia, pp. 1-12.
T. Kunugi, et al., "Synthetic study of acetylene by thermal decomposition of methane in the presence of hydrogen", The journal of chemical industry 62(1959)1677-1681 with its English Translation.
Dr. Vicari, "50 Years of Natural Gas based Acetylene Production—now the only Clean Technology for Acetylene Production", 6th International Freiberg Conference on IGCC & XtL Technologies, Coal Conversion and Syngas, May 19-22, 2014, Dresden/Radebeul, Germany, 25 pages.

* cited by examiner

HYDROGEN PRODUCTION APPARATUS AND HYDROGEN PRODUCTION METHOD

CROSS REFERENCE TO RELATED APPLICATIONS

This application is a continuation application of International Application No. PCT/JP2019/006332, filed on Feb. 20, 2019, which claims priority to Japanese Patent Application No. 2018-107491 filed on Jun. 5, 2018 and Japanese Patent Application No. 2018-124110 filed on Jun. 29, 2018, the entire contents of which are incorporated by reference herein.

BACKGROUND ART

Technical Field

The present disclosure relates to a hydrogen production apparatus and a hydrogen production method.

Related Art

A large amount of fossil fuel (for example, coal, heavy oil, and super heavy oil) is combusted in plants, such as a thermal power plant, a steel plant, and a boiler. An exhaust gas containing carbon dioxide ($CO_2$), sulfur oxides ($SO_x$), and nitrogen oxides ($NO_x$) is emitted along with the combustion of the fossil fuel. Carbon dioxide contained in the exhaust gas is regarded as one of greenhouse gases that are considered to cause global warming. Therefore, also in the United Nations Framework Convention on Climate Change and the like, restrictions are imposed on the emission amount of carbon dioxide into the atmosphere.

In view of the foregoing, there has been developed a technology of pyrolyzing methane accommodated in a reaction vessel into soot or graphite (hereinafter collectively referred to as "solid carbon") and hydrogen to produce fuel (hydrogen) without generating carbon dioxide (for example, Patent Literature 1).

CITATION LIST

Patent Literature

Patent Literature 1: JP 2008-545603 A

SUMMARY

Technical Problem

However, when methane is pyrolyzed, solid carbon is generated in addition to hydrogen. Then, there arises a problem in that the solid carbon adheres to an inner wall of the reaction vessel, and the efficiency of a pyrolysis reaction is decreased.

In view of the above-mentioned problem, the present disclosure has an object to provide a hydrogen production apparatus and a hydrogen production method capable of suppressing the adhesion of solid carbon to an inner wall of a reaction vessel.

Solution to Problem

In order to solve the above-mentioned problem, according to one aspect of the present disclosure, there is provided a hydrogen production apparatus, including: a first furnace configured to heat a mixed gas of a raw material gas, which contains at least methane, and hydrogen to 1,000° C. or more and 2,000° C. or less; and a second furnace configured to accommodate a catalyst for accelerating a reaction of a first gas generated in the first furnace to a nanocarbon material, and to maintain the first gas at 500° C. or more and 1,200° C. or less.

In addition, the hydrogen production apparatus may include a cooling unit configured to rapidly cool the first gas generated in the first furnace to 600° C. or less, wherein the first gas rapidly cooled by the cooling unit is introduced into the second furnace.

In addition, the first furnace may accommodate a catalyst for accelerating a reaction of the mixed gas to any one or both of acetylene and ethylene.

In addition, a furnace has a lower temperature of the first furnace and the second furnace may use heat released from a furnace having a higher temperature thereof as a heating source.

In addition, at least a heating source of the first furnace may be a light collecting device configured to collect sunlight, and to generate solar heat.

In addition, the hydrogen production apparatus may include a preheating unit configured to preheat the raw material gas with heat released from a furnace having a lower temperature of the first furnace and the second furnace.

In addition, the hydrogen production apparatus may further include a first heat exchange unit configured to subject a second gas generated in the second furnace and the raw material gas to heat exchange, wherein the raw material gas subjected to heat exchange in the first heat exchange unit is introduced into the preheating unit.

In addition, the hydrogen production apparatus may include a second heat exchange unit configured to subject the first gas discharged from the first furnace and the raw material gas preheated by the preheating unit to heat exchange, wherein the first gas subjected to heat exchange by the second heat exchange unit is introduced into the second furnace.

In order to solve the above-mentioned problem, according to one aspect of the present disclosure, there is provided a hydrogen production method, including: heating a mixed gas of a raw material gas, which contains at least methane, and hydrogen to 1,000° C. or more and 2,000° C. or less to generate a first gas; and maintaining the first gas at 500° C. or more and 1,200° C. or less to convert the first gas into a nanocarbon material.

Effects of Disclosure

According to the present disclosure, it is possible to suppress the adhesion of solid carbon to the inner wall of the reaction vessel.

DESCRIPTION OF EMBODIMENTS

Figure 1:
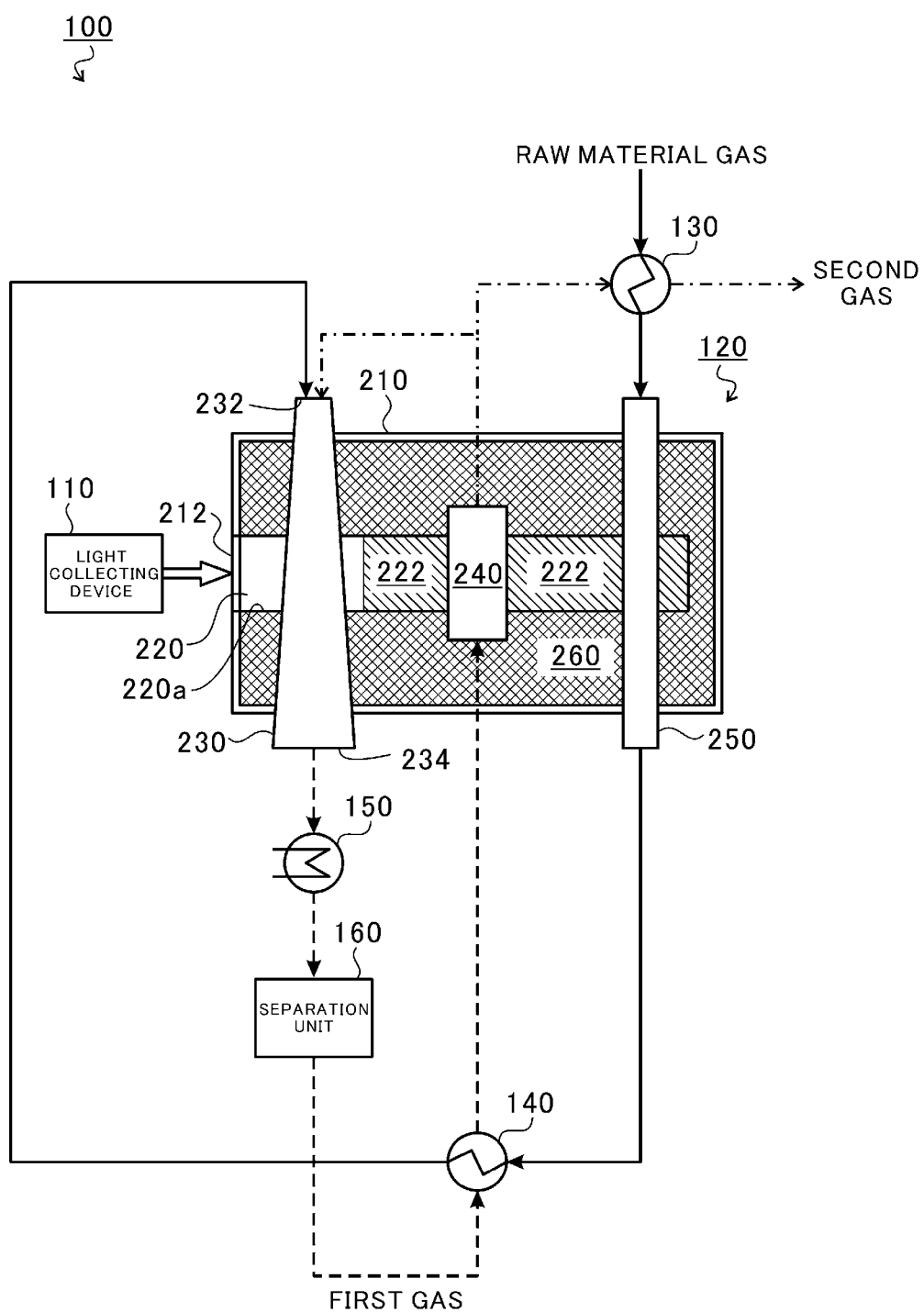
FIG. 1 is a diagram for illustrating a hydrogen production apparatus according to a first embodiment.

Now, with reference to the attached drawings, embodiments of the present disclosure are described in detail. Dimensions, materials, and other specific numerical values represented in the embodiments are merely examples used for facilitating the understanding of the disclosure, and do not limit the present disclosure otherwise particularly noted. Elements having substantially the same functions and configurations herein and in the drawings are denoted by the same reference symbols to omit redundant description thereof. In addition, illustration of elements with no direct relationship to the present disclosure is omitted.

First Embodiment

FIG. 1 is a diagram for illustrating a hydrogen production apparatus 100 according to a first embodiment. In FIG. 1, the solid line arrows each indicate a flow of a raw material gas. In FIG. 1, the broken line arrows each indicate a flow of a first gas. In addition, in FIG. 1, the alternate long and short dash line arrows each indicate a flow of a second gas. In FIG. 1, the outlined arrow indicates collected sunlight. In addition, in the first embodiment, description is given of an example of the case in which a first furnace 230 has a temperature higher than that of a second furnace 240.

As illustrated in FIG. 1, the hydrogen production apparatus 100 includes a light collecting device 110, a heating unit 120, a first heat exchange unit 130, a second heat exchange unit 140, a cooling unit 150, and a separation unit 160.

The light collecting device 110 is configured to collect sunlight, and to guide the sunlight to the heating unit 120 (lighting window 212). The heating unit 120 includes a housing 210, a furnace chamber 220, a heat transfer material 222, a first furnace 230, a second furnace 240, a preheating unit 250, and a heat insulating material 260. In FIG. 1, the heat transfer material 222 is indicated by hatching, and the heat insulating material 260 is indicated by cross hatching.

Figure 2A:
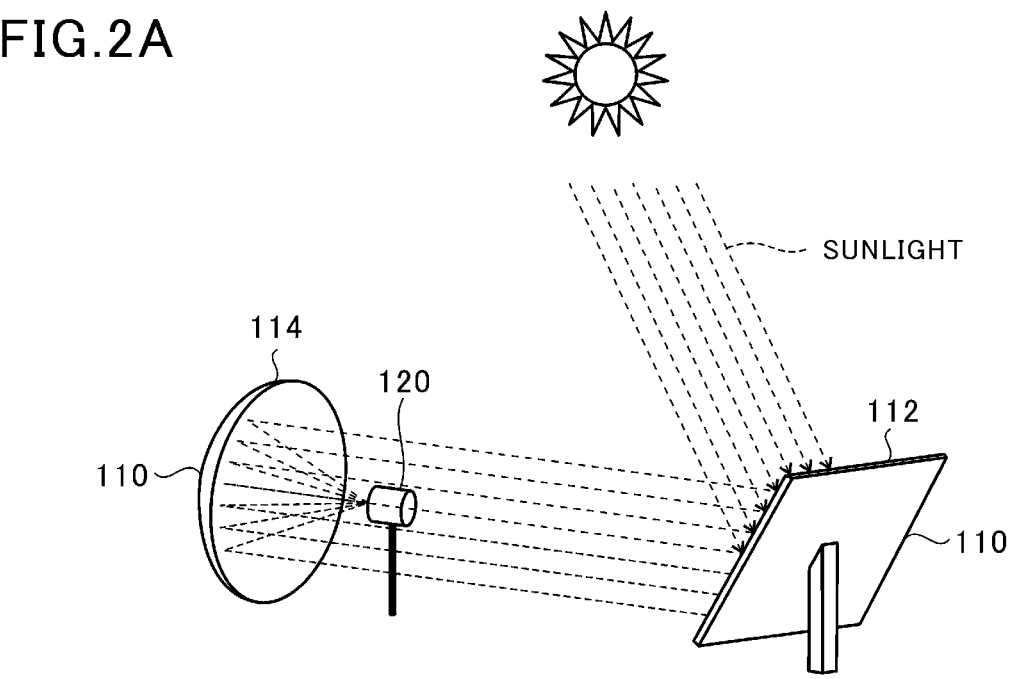
FIG. 2A is a view for illustrating an external appearance of each of a light collecting device and a heating unit.
Figure 2B:
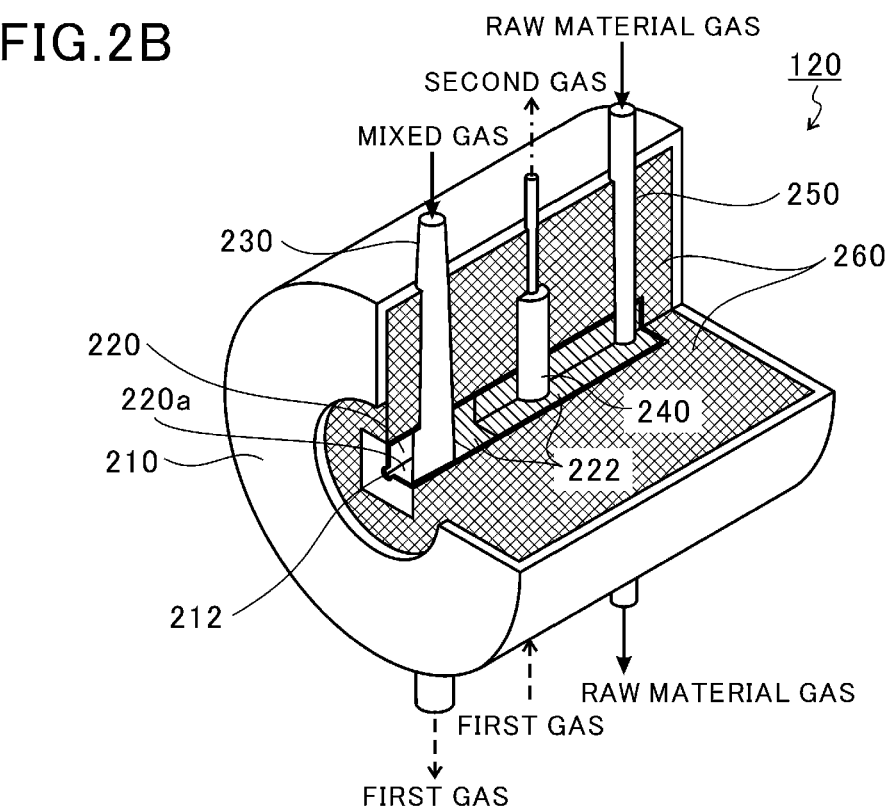
FIG. 2B is a partially cutaway perspective view of the heating unit.

FIG. 2A is a view for illustrating an external appearance of each of the light collecting device 110 and the heating unit 120. FIG. 2B is a partially cutaway perspective view of the heating unit 120. In FIG. 2B, the heat transfer material 222 is indicated by hatching, and the heat insulating material 260 is indicated by cross hatching.

As illustrated in FIG. 2A, the light collecting device 110 is a device configured to collect the sunlight, and to convert the sunlight into solar heat. The light collecting device 110 includes one or a plurality of heliostats (plane mirrors) 112, a parabolic curved mirror 114, and a furnace wall 220a described later. The heliostat 112 is configured to reflect and guide the sunlight to the parabolic curved mirror 114. The parabolic curved mirror 114 is a mirror having a reflecting surface in a concave shape. The parabolic curved mirror 114 is configured to collect the sunlight reflected by the heliostat 112, and to guide the sunlight to the heating unit 120 (lighting window 212).

As illustrated in FIG. 2B, the housing 210 of the heating unit 120 has a cylindrical shape. The housing 210 is provided so that the axial direction thereof is matched with a horizontal direction. The lighting window 212 is formed on a side surface of the housing 210. The furnace chamber 220 is formed in the housing 210 so as to be contiguous to the lighting window 212. That is, the lighting window 212 partitions the furnace chamber 220 from an outside. The furnace chamber 220 is a space extending in the horizontal direction. The furnace wall 220a forming the furnace chamber 220 is made of an endothermic material (inorganic material having high heat resistance, such as black ceramics).

The first furnace 230, the second furnace 240, and the preheating unit 250 each have a tube shape. The first furnace 230 and the preheating unit 250 are provided so as to penetrate through the furnace chamber 220. The second furnace 240 is provided in the furnace chamber 220. The first furnace 230 is provided at a position closest to the lighting window 212. The second furnace 240 is adjacent to the first furnace 230. The preheating unit 250 is adjacent to the second furnace 240. That is, the first furnace 230, the second furnace 240, and the preheating unit 250 are provided in the furnace chamber 220 in the stated order from the side closer to the lighting window 212. In the furnace chamber 220, the heat transfer material 222 is arranged between the first furnace 230 and the second furnace 240, between the second furnace 240 and the preheating unit 250, and between the preheating unit 250 and the heat insulating material 260. That is, the heat transfer material 222 is separated from the first furnace 230, and surrounds the second furnace 240 and the preheating unit 250. The heat transfer material 222 is, for example, graphite or ceramics.

The sunlight that has passed through the lighting window 212 to be guided to an inside of the furnace chamber 220 is, for example, radiated to the first furnace 230 or radiated to the furnace wall 220a forming the furnace chamber 220, thereby being converted into thermal energy (solar heat) to heat the first furnace 230 and the furnace wall 220a. With this, the first furnace 230 is maintained at 1,000° C. or more and 2,000° C. or less. The heat transfer material 222 is not in contact with the first furnace 230, with the result that the entire circumference of the first furnace 230 is exposed to radiation. With this, the first furnace 230 is efficiently heated with the sunlight. In addition, the heat (heat radiation) released from the first furnace 230 is transmitted to the second furnace 240 through the heat transfer material 222, and the second furnace 240 is maintained at 500° C. or more and 1,200° C. or less. In addition, the heat released from the second furnace 240 is transmitted to the preheating unit 250 through the heat transfer material 222, and the preheating unit 250 is maintained at a predetermined preheating temperature (temperature exceeding normal temperature (25° C.)). When the heat transfer material 222 comes into contact with each entire circumference of the second furnace 240 and the preheating unit 250, the second furnace 240 and the preheating unit 250 are efficiently heated.

The heat insulating material 260 is arranged in the housing 210. The heat insulating material 260 surrounds the furnace chamber 220. The heat insulating material 260 suppresses the outflow of heat (heat radiation) from the furnace chamber 220 to the outside.

Returning to the description with reference to FIG. 1, the first heat exchange unit 130 is configured to subject the raw material gas and the second gas (described later in detail) generated in the second furnace 240 to heat exchange. With this, the raw material gas is heated with the heat of the second gas, and the second gas is cooled. The raw material gas is a gas containing at least methane. The raw material gas is, for example, a natural gas. The raw material gas heated by the first heat exchange unit 130 is sent to the preheating unit 250. Meanwhile, the second gas cooled by the first heat exchange unit 130 is sent to a facility in a subsequent stage.

As described above, the preheating unit 250 is maintained at the preheating temperature with the heat radiation from the second furnace 240. Therefore, the preheating unit 250 can preheat (heat) the raw material gas heated by the first heat exchange unit 130 to the preheating temperature.

The second heat exchange unit 140 is configured to subject the raw material gas preheated by the preheating unit 250 and the first gas (described later in detail), which is discharged from the first furnace 230 and has not been introduced into the second furnace 240, to heat exchange. With this, the raw material gas is heated with the heat of the first gas, and the first gas is cooled. The raw material gas heated by the second heat exchange unit 140 is introduced into the first furnace 230. Meanwhile, the first gas cooled by the second heat exchange unit 140 is introduced into the second furnace 240.

The raw material gas heated by the first heat exchange unit 130, the preheating unit 250, and the second heat exchange unit 140, and the second gas generated in the second furnace 240 are introduced into the first furnace 230. The second gas contains at least hydrogen ($H_2$), which is described later in detail.

The raw material gas and hydrogen (mixed gas) introduced into the first furnace 230 is maintained at 1,000° C. or more and 2,000° C. or less by the light collecting device 110 as described above. Then, for example, reactions represented by the following reaction formula (1) and reaction formula (2) proceed, and methane ($CH_4$) contained in the raw material gas is converted into acetylene ($C_2H_2$) and ethylene ($C_2H_4$).

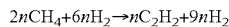

$2nCH_4 + 6nH_2 \rightarrow nC_2H_2 + 9nH_2$  Reaction Formula (1)

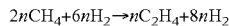

$2nCH_4 + 6nH_2 \rightarrow nC_2H_4 + 8nH_2$  Reaction Formula (2)

In the reaction formula (1) and the reaction formula (2), "n" represents an integer of 1 or more.

The amount of hydrogen in the mixed gas introduced into the first furnace 230 is 0.1 mol or more and 8 mol or less with respect to methane (1 mol) in the mixed gas. The amount of hydrogen in the mixed gas is preferably 3 mol or more with respect to methane in the mixed gas. When hydrogen is introduced in an amount of 3 mol or more with respect to methane, the first furnace 230 can improve the yield of acetylene and ethylene. Thus, the first furnace 230 can reduce the yield of the solid carbon.

Hydrogen has a relatively large heat capacity. Therefore, when hydrogen is introduced in an amount of more than 8 mol with respect to methane, the thermal energy required for maintaining the temperature of the first furnace 230 is increased. In view of the foregoing, hydrogen is introduced into the first furnace 230 in an amount of 8 mol or less with respect to methane. With this, the thermal energy supplied in order to maintain the temperature of the first furnace 230 at 1,000° C. or more and 2,000° C. or less can be reduced.

As described above, when the raw material gas and hydrogen are introduced into the first furnace 230, a first gas containing at least acetylene, ethylene, and unreacted hydrogen is generated.

The cooling unit 150 is configured to rapidly cool the first gas generated in the first furnace 230 to 600° C. or less. With this, the cooling unit 150 can suppress the pyrolysis of acetylene and ethylene contained in the first gas.

The first gas rapidly cooled by the cooling unit 150 is introduced into the separation unit 160. The separation unit 160 includes a ceramic hydrogen separation membrane (for example, a porous ceramic hydrogen separation membrane). The separation unit 160 is configured to separate and remove hydrogen from the first gas. With the configuration including the separation unit 160, the hydrogen production apparatus 100 can reduce the amount of hydrogen to be introduced into the second furnace 240. With this, the thermal energy supplied in order to maintain the temperature of the second furnace 240 at 500° C. or more and 1,200° C. or less can be reduced. Then, the first gas having hydrogen removed therefrom by the separation unit 160 is subjected to heat exchange by the above-mentioned second heat exchange unit 140, and then is introduced into the second furnace 240.

The second furnace 240 accommodates a catalyst for accelerating the reaction of the first gas to a nanocarbon material (for example, the reaction represented by the following reaction formula (3) or the reaction represented by the following reaction formula (4)). In this embodiment, the second furnace 240 accommodates a particle-shaped catalyst. The first gas flows from a lower part to an upper part of the second furnace 240. Therefore, a fluidized bed of the catalyst is formed by the first gas.

In addition, as described above, the first gas introduced into the second furnace 240 is maintained at 500° C. or more and 1,200° C. or less with the heat radiation from the first furnace 230. Therefore, in the second furnace 240, the pyrolysis reaction (the following reaction formula (3) and reaction formula (4)) of the first gas (acetylene and ethylene) proceeds, and a nanocarbon material is generated (grows) on the surface of the catalyst. When the nanocarbon material is a carbon nanotube, the catalyst for accelerating the reaction of the first gas (any one or both of acetylene and ethylene) to the nanocarbon material is one or a plurality of catalysts selected from the group consisting of iron (Fe), nickel (Ni), cobalt (Co), and palladium (Pd).

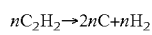

$nC_2H_2 \rightarrow 2nC + nH_2$  Reaction Formula (3)

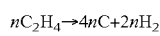

$nC_2H_4 \rightarrow 4nC + 2nH_2$  Reaction Formula (4)

In the reaction formula (3) and the reaction formula (4), "n" represents an integer of 1 or more. In addition, the above-mentioned carbon nanotube is any one or a plurality of a single-walled carbon nanotube (diameter: 1 nm order), a multi-walled carbon nanotube (diameter: 10 nm order), a carbon nanofiber (diameter: 100 nm order), and a carbon fiber (diameter: 1,000 nm order to 100,000 nm order).

In addition, along with the progress of the reaction of the first gas to the nanocarbon material, the second gas is generated in the second furnace 240. The second gas contains at least hydrogen. A part of the second gas (hydrogen) generated in the second furnace 240 is introduced into the first furnace 230, and the remaining part is cooled by the first heat exchange unit 130 and then sent to the facility in the subsequent stage.

[Hydrogen Production Method]

Figure 3:
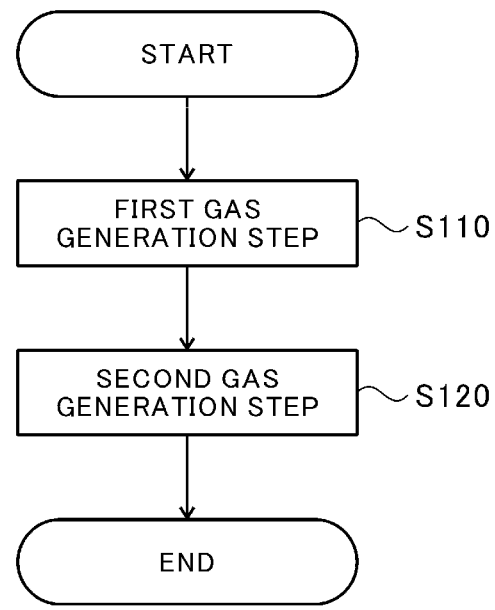
FIG. 3 is a flowchart for illustrating a processing flow of a hydrogen production method according to the first embodiment.

Subsequently, a hydrogen production method using the above-mentioned hydrogen production apparatus 100 is described. FIG. 3 is a flowchart for illustrating a processing flow of a hydrogen production method according to the first embodiment. As illustrated in FIG. 3, the hydrogen production method includes a first gas generation step S110 and a second gas generation step S120.

[First Gas Generation Step S110]

The first gas generation step S110 is a step in which the first furnace 230 heats a mixed gas of a raw material gas and hydrogen to 1,000° C. or more and 2,000° C. or less. When the first gas generation step S110 is performed, a first gas containing at least acetylene, ethylene, and hydrogen is generated.

[Second Gas Generation Step S120]

The second gas generation step S120 is a step in which the second furnace 240 maintains the first gas at 500° C. or more and 1,200° C. or less in the presence of a catalyst for accelerating the reaction of the first gas to a nanocarbon material. When the second gas generation step S120 is performed, acetylene and ethylene are pyrolyzed, and the nanocarbon material, and a second gas containing at least hydrogen are generated.

As described above, in the hydrogen production apparatus 100 according to the first embodiment and the hydrogen production method using the same, the first furnace 230 heats the mixed gas of the raw material gas and hydrogen to 1,000° C. or more and 2,000° C. or less. With this, acetylene and ethylene can be generated in the first furnace 230. Thus, in the first furnace 230, the generation of solid carbon (soot and graphite) can be suppressed. That is, the adhesion of the solid carbon to an inner wall of the first furnace 230 can be suppressed.

Solid carbon may be generated depending on the content of hydrogen in the mixed gas. In this case, as illustrated in FIG. 1, the shape of the first furnace 230 is designed so that the diameter of an upper opening 232 is smaller than the diameter of a lower opening 234, and a flow passage sectional area (horizontal sectional area) is gradually increased from the upper opening 232 to the lower opening 234. In addition, the first furnace 230 is made of a material having a linear expansion coefficient different from that of the solid carbon. The first furnace 230 is made of a ceramic material, such as alumina, stearite, forsterite, or zirconia.

With this, in the hydrogen production apparatus 100, a difference can be made between the thermal expansion amount of the first furnace 230 and the thermal expansion amount of the solid carbon adhering to an inner wall of the first furnace 230 by changing the temperature in the first furnace 230 during a period of time in which the production of hydrogen is suspended. Thus, even when the solid carbon has adhered to the inner wall of the first furnace 230, the hydrogen production apparatus 100 can apply a shearing force along a contact surface between the first furnace 230 and the solid carbon by making a difference between those thermal expansion amounts. That is, the hydrogen production apparatus 100 can reduce the adhesion force between the inner wall of the first furnace 230 and the solid carbon, and can induce peeling of the solid carbon from the inner wall of the first furnace 230. The peeled solid carbon falls outside the first furnace 230 by the own weight thereof through the lower opening 234.

In addition, as described above, in the hydrogen production apparatus 100, the pyrolysis reaction proceeds in the second furnace 240 instead of the first furnace 230. That is, in the hydrogen production apparatus 100, the pyrolysis of acetylene (C2) and ethylene (C2) instead of methane (C1) proceeds. In the pyrolysis of acetylene and ethylene, the yield of the nanocarbon material is high as compared to that in the pyrolysis of methane. Thus, in the hydrogen production apparatus 100, the nanocarbon material can be produced instead of the solid carbon in addition to hydrogen.

Further, the nanocarbon material is generated only on the surface of the catalyst unlike the solid carbon. Thus, the hydrogen production apparatus 100 can suppress the adhesion of a solid material to an inner wall of the second furnace 240.

In addition, as described above, the first furnace 230 uses solar heat collected by the light collecting device 110 as a heating source. With this, the hydrogen production apparatus 100 is not required to consume valuable fossil resources in order to obtain a heating source, with the result that the cost required for heating can be significantly suppressed. Further, the second furnace 240 uses the heat released from the first furnace 230 as a heating source. Thus, the hydrogen production apparatus 100 can fix carbon dioxide as the nanocarbon material at low cost to produce hydrogen. In addition, the hydrogen production apparatus 100 does not newly generate carbon dioxide in a process of obtaining a heating source, unlike the case of using the combustion heat of fossil resources or the electric energy derived therefrom in order to obtain a heating source. Therefore, the hydrogen production apparatus 100 can exhibit the high effect of reducing carbon dioxide.

In addition, as described above, the hydrogen production apparatus 100 can heat the raw material gas with the heat of the second gas because of the presence of the first heat exchange unit 130. Further, the hydrogen production apparatus 100 can preheat the raw material gas with the heat released from the second furnace 240 because of the presence of the preheating unit 250. In addition, the hydrogen production apparatus 100 can heat the raw material gas with the heat of the first gas because of the presence of the second heat exchange unit 140. As described above, the hydrogen production apparatus 100 can heat the raw material gas with exhaust heat, and hence the cost required for heating can be further suppressed.

Second Embodiment

The first furnace 230 according to the above-mentioned first embodiment does not accommodate a catalyst. However, a first furnace 330 may accommodate the catalyst.

Figure 4:
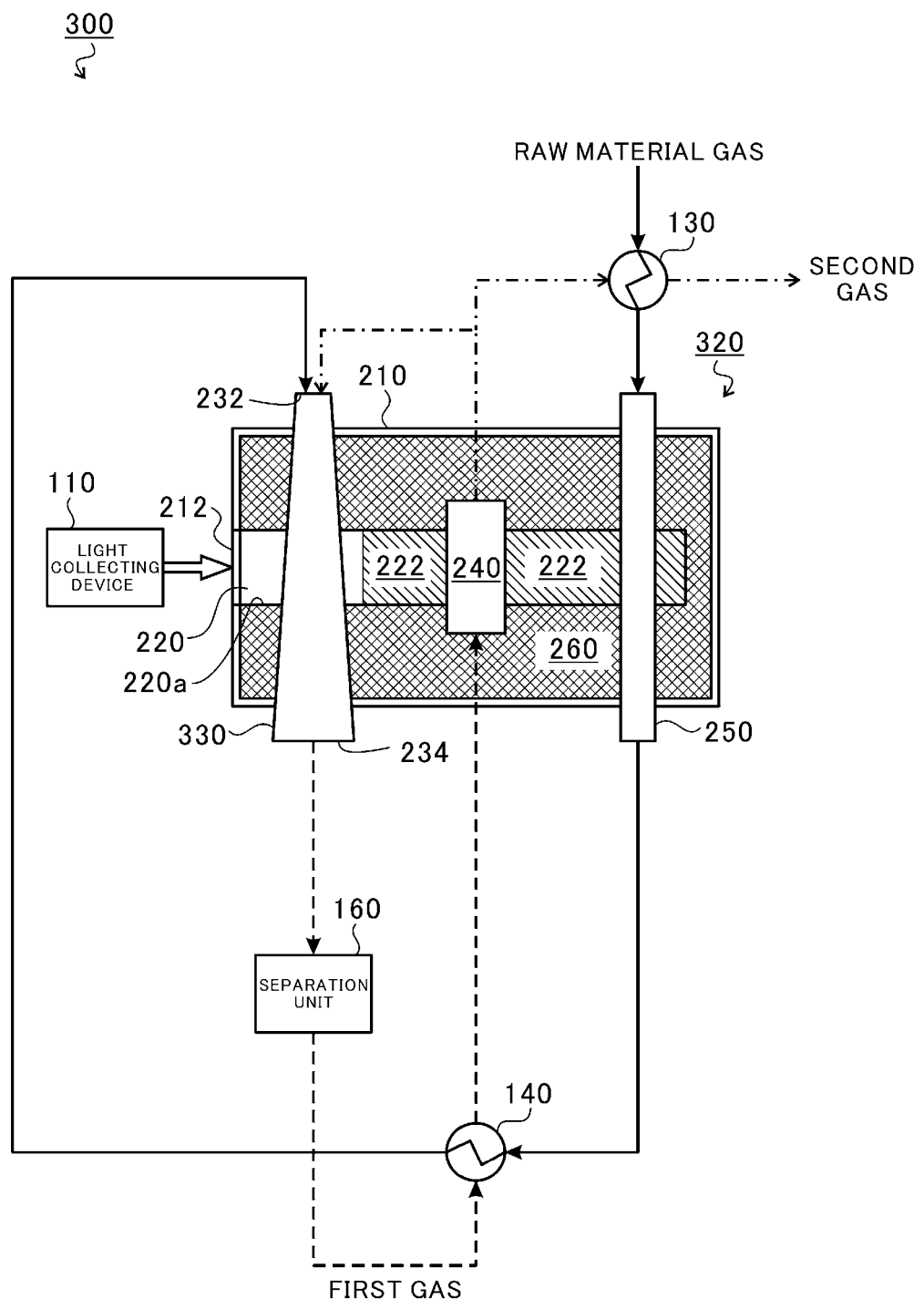
FIG. 4 is a diagram for illustrating a hydrogen production apparatus according to a second embodiment.

FIG. 4 is a diagram for illustrating a hydrogen production apparatus 300 according to a second embodiment. In FIG. 4, the solid line arrows each indicate a flow of the raw material gas. In FIG. 4, the broken line arrows each indicate a flow of the first gas. In FIG. 4, the alternate long and short dash line arrows each indicate a flow of the second gas. In FIG. 4, the outlined arrow indicates collected sunlight. In addition, in the second embodiment, description is given of an example of the case in which the first furnace 330 has a temperature higher than that of the second furnace 240.

As illustrated in FIG. 4, the hydrogen production apparatus 300 includes the light collecting device 110, a heating unit 320, the first heat exchange unit 130, the second heat exchange unit 140, and the separation unit 160. In addition, the heating unit 320 includes the housing 210, the furnace chamber 220, the heat transfer material 222, the first furnace 330, the second furnace 240, the preheating unit 250, and the heat insulating material 260. Constituent elements that are substantially equal to those of the above-mentioned hydrogen production apparatus 100 are denoted by the same reference symbols as those therein, and description thereof is omitted. In addition, in FIG. 4, the heat transfer material 222 is indicated by hatching, and the heat insulating material 260 is indicated by cross hatching.

The first furnace 330 accommodates a catalyst for accelerating the reaction of the mixed gas to any one or both of acetylene and ethylene (for example, the reaction represented by the above-mentioned reaction formula (1) or the reaction represented by the above-mentioned reaction formula (2)). The first furnace 330 accommodates a catalyst as a packed bed. Examples of the catalyst for accelerating the reaction of the mixed gas to any one or both of acetylene and ethylene include one or a plurality of catalysts selected from the group consisting of molybdenum (Mo), tungsten (W), iron (Fe), vanadium (V), and chromium (Cr).

When the first furnace 330 accommodates the catalyst, the pyrolysis of acetylene and ethylene can be suppressed without rapidly cooling the first gas. With this, as compared to the hydrogen production apparatus 100, the hydrogen production apparatus 300 can omit the cooling unit 150. Therefore, the hydrogen production apparatus 300 can improve the heat recovery efficiency of the first gas by the second heat exchange unit 140.

In addition, when the first furnace 330 accommodates the catalyst, the amount of hydrogen in the mixed gas is preferably 0.5 mol or more, more preferably 1 mol or more, still more preferably 1.5 mol or more with respect to methane in the mixed gas. When hydrogen is introduced in an amount of 0.5 mol or more with respect to methane, the yield of acetylene and ethylene can be improved.

The embodiments have been described above with reference to the attached drawings, but, needless to say, the present disclosure is not limited to the embodiments. It is apparent that those skilled in the art may arrive at various alternations and modifications within the scope of claims, and those examples are construed as naturally falling within the technical scope of the present disclosure.

For example, in the above-mentioned embodiments, the description has been given of the example of the configuration in which the second gas (hydrogen) generated in the second furnace 240 is introduced into each of the first furnaces 230 and 330. However, hydrogen produced by another device may be introduced into each of the first furnaces 230 and 330 in addition to or instead of the second gas generated in the second furnace 240.

In addition, in the above-mentioned embodiments, the description has been given of the example of the case in which each of the first furnaces 230 and 330 has such a shape that the flow passage sectional area is gradually increased from the upper opening 232 to the lower opening 234. However, in each of the first furnaces 230 and 330, the flow passage sectional area in a portion located in the furnace chamber 220 may be smaller than the other flow passage sectional areas. With this, the first furnaces 230 and 330 can each shorten the residence time period of the mixed gas under a temperature environment of 1,000° C. or more and 2,000° C. or less. That is, when the residence time period is shortened, and the flow velocity is increased, a laminar convection heat transfer condition is switched to a turbulent convection heat transfer condition, and the heat transfer rate from the first furnaces 230 and 330 to the mixed gas can be increased (the mixed gas can be rapidly heated). In addition, the residence time period is shortened, that is, the heating time is shortened, and hence the time from heating of the mixed gas to cooling thereof is shortened (the mixed gas can be rapidly cooled). In other words, when the first furnaces 230 and 330 are each designed so that the flow passage sectional area of the portion located in the furnace chamber 220 is smaller than the other flow passage sectional areas, the mixed gas can be rapidly cooled immediately after being rapidly heated. With this, the progress of the pyrolysis of acetylene and ethylene contained in the first gas generated by rapid heating can be suppressed. Therefore, the yield of acetylene and ethylene in the first gas can be increased. It is appropriate that, in each of the first furnaces 230 and 330, inert particles be filled into the portion located in the furnace chamber 220 to narrow the flow passage sectional area. In this case, the inert particles that are brought into contact with the inner wall of each of the first furnaces 230 and 330 are heated by heat conduction from the inner wall of each of the first furnaces 230 and 330. Therefore, the mixed gas is heated from the surface of each of the inert particles in addition to the surface of the inner wall of each of the first furnaces 230 and 330 (that is, the heat transfer area is increased). With this, the first furnaces 230 and 330 can further rapidly heat the raw material gas.

In addition, in the above-mentioned embodiments, the description has been given of the example of the case in which each of the first furnaces 230 and 330 has a temperature higher that of the second furnace 240. However, each of the first furnaces 230 and 330 may have a temperature lower than that of the second furnace 240. In this case, each of the first furnaces 230 and 330 may use the heat released from the second furnace 240 as a heating source.

In addition, in the above-mentioned embodiments, the description has been given of the example of the case in which the housing 210 of the heating unit 120 has a cylindrical shape. However, the shape of the housing 210 of the heating unit 120 is not limited. Further, in the above-mentioned embodiments, the description has been given of the example of the case in which the housing 210 is provided so that the axial direction thereof is matched with the horizontal direction. However, the setting direction of the housing 210 is not limited. For example, the housing 210 may be provided so that the axial direction thereof is matched with a direction crossing the horizontal direction.

In addition, in the above-mentioned embodiments, the description has been given of the example of the heating unit 120 of an indirect heating type in which each of the first furnaces 230 and 330 is arranged in the furnace chamber 220, and the first gas passing through each of the first furnaces 230 and 330 is indirectly heated. However, the hydrogen production apparatus 100 and 300 may each include a heating unit of a direct heating type, which includes the lighting window 212 having airtightness, and in which the first gas is directly introduced into the furnace chamber 220 to be directly heated.

In addition, in the above-mentioned embodiments, the description has been given of the example of the light collecting device 110 serving as a heating source of each of the first furnaces 230 and 330. However, as long as the mixed gas can be converted into the first gas in each of the first furnaces 230 and 330, the kind and configuration of the heating source are not limited. For example, as the heating source of each of the first furnaces 230 and 330, a combustion device, an electric heater, or the like may be used instead of or in addition to the light collecting device 110. While the function of the light collecting device 110 is decreased, for example, in cloudy weather or rainy weather, the heating source of each of the first furnaces 230 and 330 may be switched to the combustion device or the electric heater. The combustion device may combust the raw material gas or hydrogen produced by each of the hydrogen production apparatus 100 and 300.

In addition, in the above-mentioned embodiments, the description has been given of the example of the light collecting device 110 including the heliostat 112 and the parabolic curved mirror 114. However, as long as the light collecting device 110 can collect sunlight and generate solar heat, the kind and configuration thereof are not limited. For example, the light collecting device 110 may be a tower-type light collecting device.

In addition, in the above-mentioned embodiments, the description has been given of the example of the configuration in which each of the hydrogen production apparatus 100 and 300 includes the preheating unit 250. However, the preheating unit 250 is not an essentially required configuration.

In addition, in the above-mentioned embodiments, the description has been given of the example of the configuration in which each of the hydrogen production apparatus 100 and 300 includes the first heat exchange unit 130. However, the first heat exchange unit 130 is not an essentially required configuration.

In addition, in the above-mentioned embodiments, the description has been given of the example of the configuration in which each of the hydrogen production apparatus 100 and 300 includes the second heat exchange unit 140. However, the second heat exchange unit 140 is not an essentially required configuration.

In addition, in the above-mentioned embodiments, the description has been given of the example of the configuration in which the second furnace 240 accommodates the catalyst as the fluidized bed. However, a substrate having catalyst particles carried on a surface thereof may be accommodated in the second furnace 240. In this case, the second furnace 240 may extend in the horizontal direction. In addition, the second furnace 240 may accommodate the catalyst as a packed bed.

In addition, in the above-mentioned embodiments, the description has been given of the example of the case in which each of the first furnaces 230 and 330, the second furnace 240, and the preheating unit 250 extend in a vertical direction. However, any one or a plurality of each of the first furnaces 230 and 330, the second furnace 240, and the preheating unit 250 may extend in a direction crossing the vertical direction (for example, the horizontal direction).

In addition, the raw material gas may be preheated with the heat recovered by the cooling unit 150.

Figure 5:
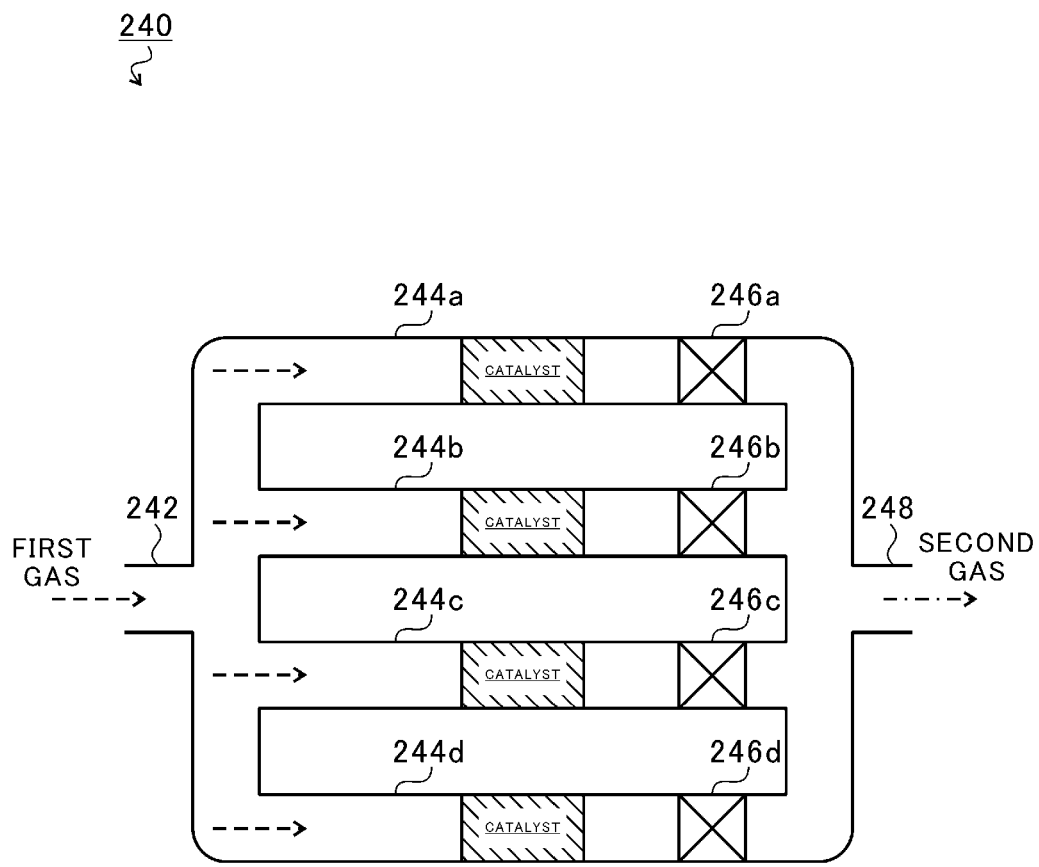
FIG. 5 is a diagram for illustrating a second furnace of a modification example.

In addition, in the above-mentioned embodiments, the description has been given of the example of the configuration in which each of the hydrogen production apparatus 100 and 300 includes one second furnace 240. However, each of the hydrogen production apparatus 100 and 300 may include a plurality of second furnaces 240. FIG. 5 is a diagram for illustrating the second furnace 240 of a modification example. As illustrated in FIG. 5, the second furnace 240 of the modification example includes an introduction path 242, a plurality of (four in this case) branch paths 244a, 244b, 244c, and 244d, a plurality of (four in this case) valves 246a, 246b, 246c, and 246d, and a discharge path 248. That is, the second furnace 240 may be a manifold.

The introduction path 242 is a pipe configured to introduce the first gas from the first furnace 230. The branch paths 244a to 244d are pipes branched from the introduction path 242. The discharge path 248 is a pipe in which the branch paths 244a to 244d are joined together.

The branch paths 244a to 244d each accommodate the catalyst for accelerating the reaction of the first gas to the nanocarbon material. The valves 246a to 246d are each an on/off valve. The valves 264a to 246d are each, for example, a ball valve for high temperature. The valve 246a is provided on a downstream side (discharge path 248 side) of the catalyst in the branch path 244a. The valve 246a is configured to open and close the branch path 244a. The valve 246b is provided on the downstream side of the catalyst in the branch path 244b. The valve 246b is configured to open and close the branch path 244b. The valve 246c is provided on the downstream side of the catalyst in the branch path 244c. The valve 246c is configured to open and close the branch path 244c. The valve 246d is provided on the downstream side of the catalyst in the branch path 244d. The valve 246d is configured to open and close the branch path 244d.

The valves 246a to 246d are controlled to be opened and closed so that at least one of the valves 246a to 246d is brought into an opened state. With this, the nanocarbon material can be taken out from an upstream side of the valves 246a to 246d in a closed state in the branch paths 244a to 244d without suspending the hydrogen production apparatus 100.

When the temperature of a gas flowing through each of the branch paths 244a to 244d exceeds the heat resistant temperature of each of the valves 246a to 246d, a region between a section filled with the catalyst and each of the valves 246a to 246d may be cooled (for example, cooled with air or cooled with water). In addition, the branch paths 244a to 244d may be formed so as to surround each of the first furnaces 230 and 330.

INDUSTRIAL APPLICABILITY

The present disclosure is applicable to a hydrogen production apparatus and a hydrogen production method.

What is claimed is:

1. A hydrogen production apparatus, comprising:
   a first furnace configured to heat a mixed gas of a raw material gas, which contains at least methane, and hydrogen to 1,000° C. or more and 2,000° C. or less;
   a supplying unit that supplies the mixed gas to the first furnace; and
   a second furnace configured to accommodate a catalyst for accelerating a reaction of a first gas generated in the first furnace to a nanocarbon material, and to maintain the first gas at 500° C. or more and 1,200° C. or less;
   wherein the amount of the hydrogen in the mixed gas is 3 mol or more and 8 mol or less with respect to methane in the mixed gas; wherein the first furnace accommodates a catalyst for accelerating a reaction of the mixed gas to any one or both of acetylene and ethylene.

2. The hydrogen production apparatus according to claim 1, further comprising a cooling unit configured to cool the first gas generated in the first furnace to 600° C. or less, wherein the first gas cooled by the cooling unit is introduced into the second furnace.

3. The hydrogen production apparatus according to claim 1, further comprising a heat transfer material arranged between the first furnace and the second furnace, wherein a furnace having a lower temperature of the first furnace and the second furnace uses heat released from a furnace having a higher temperature thereof as a heating source.

4. The hydrogen production apparatus according to claim 1, wherein at least a heating source of the first furnace is a light collecting device configured to collect sunlight, and to generate solar heat.

5. The hydrogen production apparatus according to claim 1, wherein the first gas comprises one or both of acetylene and ethylene.

6. A hydrogen production apparatus comprising:
   a first furnace configured to heat a mixed gas of a raw material gas, which contains at least methane, and hydrogen to 1,000° C. or more and 2,000° C. or less;
   a second furnace configured to accommodate a catalyst for accelerating a reaction of a first gas generated in the first furnace to a nanocarbon material, and to maintain the first gas at 500° C. or more and 1,200° C. or less; and
   a preheating unit configured to preheat the raw material gas with heat released from the second furnace;

wherein a first heat exchange unit configured to subject a second gas generated in the second furnace and the raw material gas to heat exchange, wherein the raw material gas subjected to heat exchange in the first heat exchange unit is introduced into the preheating unit.

7. The hydrogen production apparatus according to claim 6, further comprising a second heat exchange unit configured to subject the first gas discharged from the first furnace and the raw material gas preheated by the preheating unit to heat exchange,
wherein the first gas subjected to heat exchange by the second heat exchange unit is introduced into the second furnace.

8. The hydrogen production apparatus according to claim 6, wherein the first furnace accommodates a catalyst for accelerating a reaction of the mixed gas to any one or both of acetylene and ethylene.

9. The hydrogen production apparatus according to claim 6, wherein the first gas comprises one or both of acetylene and ethylene.

10. A hydrogen production method, comprising:
heating a mixed gas of a raw material gas, which contains at least methane, and hydrogen to 1,000° C. or more and 2,000° C. or less to generate a first gas; and
maintaining the first gas at 500° C. or more and 1,200° C. or less to convert the first gas into a nanocarbon material;
wherein the amount of the hydrogen in the mixed gas is 3 mol or more and 8 mol or less with respect to methane in the mixed gas.

* * * * *